(12) United States Patent
Moro

(10) Patent No.: US 10,093,120 B2
(45) Date of Patent: Oct. 9, 2018

(54) IMAGE PROCESSING APPARATUS FOR PROCESSING IMAGE DATA FOR PRINTING AN IMAGE WITH A DECOLORABLE TONER

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Akihiro Moro, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/554,733

(22) Filed: Nov. 26, 2014

(65) Prior Publication Data

US 2016/0144645 A1 May 26, 2016

(51) Int. Cl.
| | | |
|---|---|---|
| *G03G 15/00* | (2006.01) | |
| *B41M 7/00* | (2006.01) | |
| *H04N 1/00* | (2006.01) | |
| *H04N 1/23* | (2006.01) | |
| *G03G 21/00* | (2006.01) | |
| *G06K 15/14* | (2006.01) | |

(52) U.S. Cl.
CPC ....... *B41M 7/0009* (2013.01); *G03G 15/6585* (2013.01); *G03G 21/00* (2013.01); *G06K 15/14* (2013.01); *H04N 1/00567* (2013.01); *H04N 1/00795* (2013.01); *H04N 1/2323* (2013.01); *G03G 15/5025* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 5,574,538 A | 11/1996 | Takahashi et al. | |
| 9,378,439 B2* | 6/2016 | Kimoto | G06K 15/1868 |
| 2001/0009602 A1* | 7/2001 | Nakayama | G06Q 30/02 386/219 |
| 2002/0051242 A1* | 5/2002 | Han | H04N 1/00352 358/474 |

(Continued)

FOREIGN PATENT DOCUMENTS

| | | |
|---|---|---|
| JP | 2000-246699 | 9/2000 |
| JP | 2010-197668 | 9/2010 |
| JP | 2013-020070 | 1/2013 |

OTHER PUBLICATIONS

Extended European Search Report for European Patent Application No. 15195622.4 dated Apr. 4, 2016.

*Primary Examiner* — Barbara Reinier
(74) *Attorney, Agent, or Firm* — Amin, Turocy & Watson LLP

(57) ABSTRACT

In accordance with an embodiment, an image forming apparatus comprises a reading section, an image processing section and a printing section. The reading section reads an image on a sheet to generate image data. The image processing section detects, from the image data, an identification image indicating that printing is carried out with decolorable toner, and decolors the detected identification image from the image data. The printing section prints the image data output from the image processing section.

13 Claims, 12 Drawing Sheets

(56) References Cited

U.S. PATENT DOCUMENTS

| | | | |
|---|---|---|---|
| 2004/0128656 A1* | 7/2004 | Yamagata | G06T 3/00 |
| | | | 717/136 |
| 2010/0118349 A1 | 5/2010 | Ozawa | |
| 2010/0272449 A1* | 10/2010 | Yoshida | H04N 1/32133 |
| | | | 399/2 |
| 2012/0194880 A1* | 8/2012 | Muroi | H04N 1/00795 |
| | | | 358/474 |
| 2012/0327488 A1 | 12/2012 | Ito | |
| 2013/0016375 A1 | 1/2013 | Hashidume et al. | |
| 2013/0070265 A1* | 3/2013 | Megawa | H04N 1/40 |
| | | | 358/1.9 |
| 2014/0078565 A1* | 3/2014 | Fujiwara | G03G 15/5062 |
| | | | 358/505 |
| 2014/0199103 A1* | 7/2014 | Terada | G03G 15/6585 |
| | | | 399/341 |
| 2015/0294202 A1* | 10/2015 | Kimoto | G06K 15/1868 |
| | | | 358/1.9 |

* cited by examiner

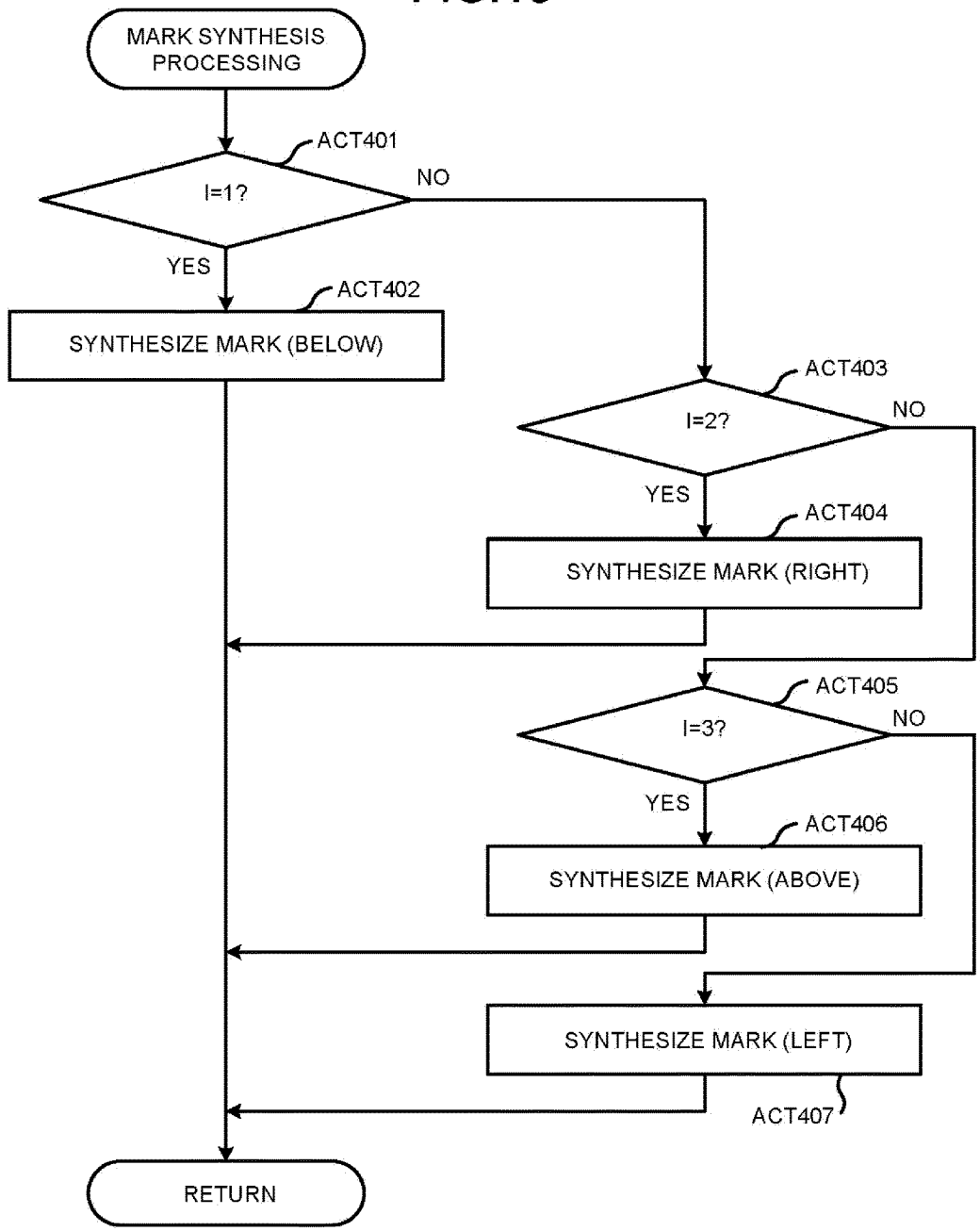

IMAGE PROCESSING APPARATUS FOR PROCESSING IMAGE DATA FOR PRINTING AN IMAGE WITH A DECOLORABLE TONER

FIELD

Embodiments described herein relate generally to an image forming apparatus and an image forming method.

BACKGROUND

There is a decolorable toner having a characteristic of decoloring the color at a certain temperature. In response to the growing social awareness of environmental protection in recent years, an image forming apparatus which is capable of printing with decolorable toner has been put to practical use. In a case of printing with decolorable toner, it is also considered that a mark for indicating the printing with decolorable toner, an image representing the decoloring times and the like are to be printed on a sheet together with the printing image.

In a case where the sheet on which the mark is printed is copied as a document, there is no doubt that the mark is also copied. However, the user does not want a copy of the mark through which the type of toner can be determined. That is, originally, the mark is the unnecessary information as the document. Thus, an image forming apparatus which can suppress the printing of the mark as needed is desired.

BRIEF DESCRIPTION OF THE DRAWINGS

FIG. 13 is a flowchart illustrating the flow of a mark synthesis processing.

DETAILED DESCRIPTION

In accordance with an embodiment, an image forming apparatus comprises a reading section, an image processing section and a printing section. The reading section reads an image on a sheet to generate image data. The image processing section detects, from the image data, an identification image indicating that printing is carried out with decolorable toner, and decolors the detected identification image from the image data. The printing section prints the image data output from the image processing section.

Hereinafter, an image forming apparatus according to the embodiment is described with reference to the accompanying drawings.

Figure 1:
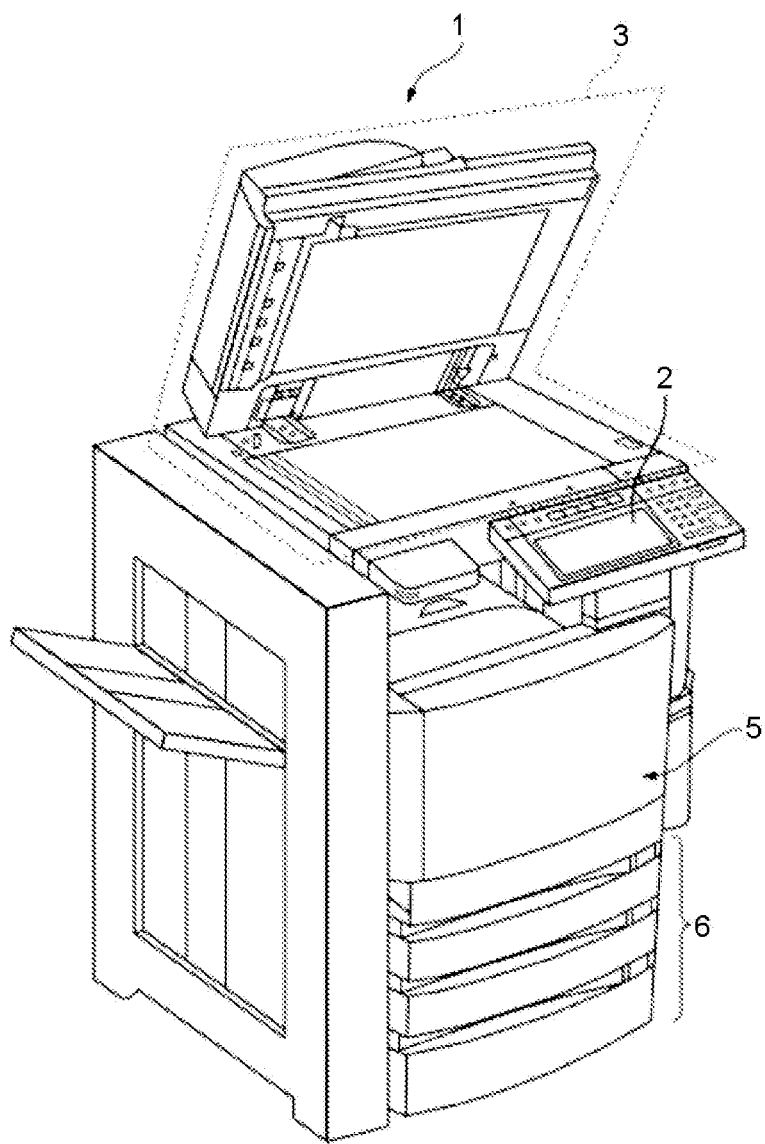
FIG. 1 is an external view illustrating an example of an image forming apparatus 1 according to an embodiment.

FIG. 1 is an external view illustrating an example of the image forming apparatus 1 according to the embodiment.

The image forming apparatus 1 is, for example, an MFP (Multifunction Peripheral). The image forming apparatus 1 reads a sheet to generate digital data (image data), and then prints the generated image data with decolorable toner or non-decolorable toner on a sheet for printing. Hereinafter, an operation mode in which printing is carried out with the decolorable toner is referred to as an "ECO mode", while an operation mode in which printing is carried out with the non-decolorable toner is referred to as a "general mode".

The sheet that is read by the image forming apparatus 1 is, for example, a document, a paper on which characters, pictures and the like are recorded, and the like, and the form of the sheet is not limited as long as it is readable. Further, the printing image data need not to be generated by the image forming apparatus 1. For example, the image data may be input to the image forming apparatus 1 via a network or a recording medium. Further, the image forming apparatus 1 is not limited to an image forming apparatus which fixes toner image, and may be an ink jet type image forming apparatus. In the example shown in FIG. 1, the image forming apparatus 1 comprises an operation section 2, a scanner section 3 (reading section), a print section 5 (printing section) and a sheet feed section 6.

Figure 2:
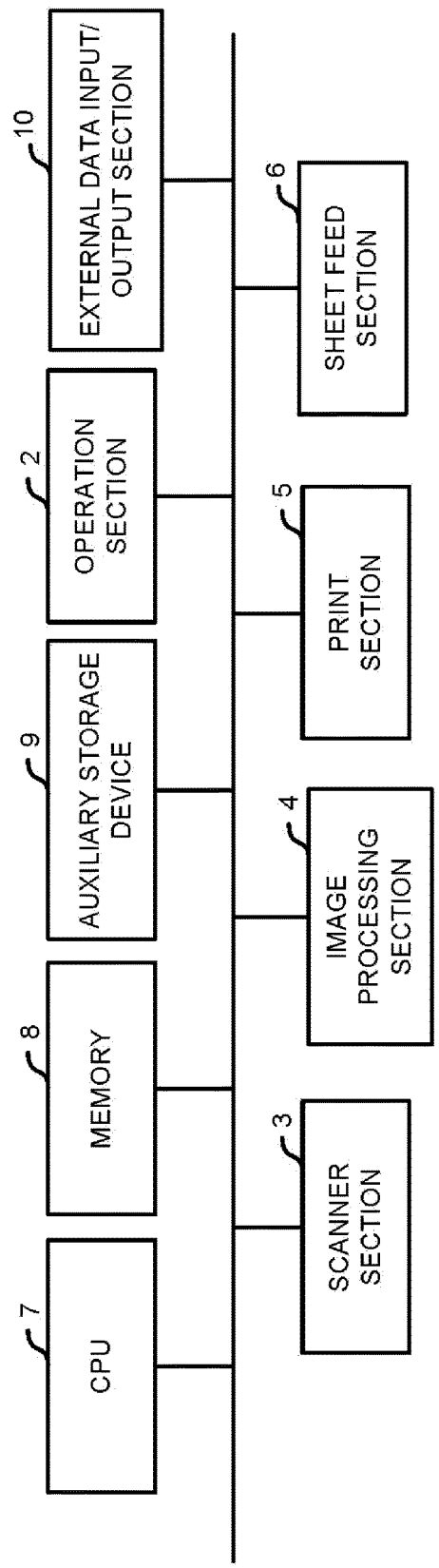
FIG. 2 is a block diagram illustrating the hardware constitution of the image forming apparatus 1.

FIG. 2 is a block diagram illustrating the hardware constitution of the image forming apparatus 1.

The image forming apparatus 1 comprises a CPU 7 (Central Processing Unit), a memory 8, an auxiliary storage device 9 and the like which are connected with each other through a bus line, and executes an image forming program. For example, the image forming program is pre-stored in the auxiliary storage device 9, and read in the memory 8 by the CPU 7. By executing the image forming program by the CPU 7, the image forming apparatus 1 functions as an apparatus comprising the operation section 2, the scanner section 3, the image processing section 4, the print section 5, the sheet feed section 6 and an external data input/output section 10. That is, the CPU 7 and the memory 8 function as the system control section 20 for controlling each functional section of the image forming apparatus 1.

Further, the whole or part of the functions of the image forming apparatus 1 may be realized through the hardware such as the ASIC (Application Specific Integrated Circuit), the PLD (Programmable Logic Device), the FPGA (Field Programmable Gate Array) and the like. The image forming program may be recorded in a computer-readable recording medium. The computer-readable recording medium may be, for example, a removable medium such as a flexible disc, a magnetic optical disc, a ROM, a CD-ROM and the like, or a storage device arranged inside the computer system such as a hard disk and the like. Alternatively, the image forming program may be transmitted via an electric communication line.

Figure 3:
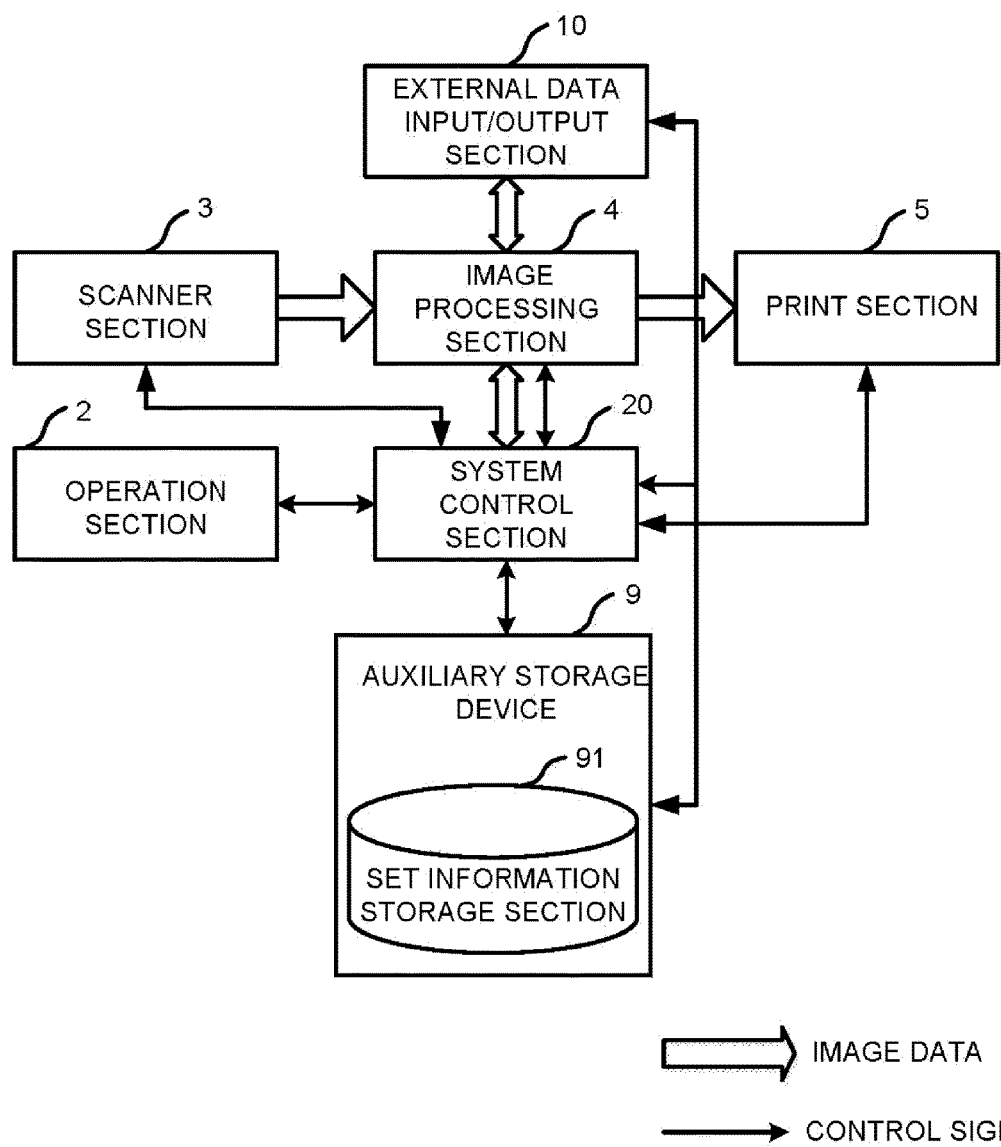
FIG. 3 is a functional block diagram illustrating the functional components of the image forming apparatus 1.

FIG. 3 is a functional block diagram illustrating the functional components of the image forming apparatus 1.

The operation section 2 receives the input of the operation of the user to the image forming apparatus 1. Specifically, the operation section 2 consists of a display device and an input device. For example, the display device may be a crystal display, an organic EL (Electroluminescence) display and the like. In addition, for example, the input device may be a keyboard, a touch panel and the like. The operation section 2 outputs the information input from the input device to the system control section 20. The input information contains the information relating to the operations of the image forming apparatus 1. The input information also contains, for example, the information indicating either color printing or monochrome printing, the information indicating either ECO mode or general mode, the information indicating either duplex printing or simplex printing and the like.

The scanner section 3 reads an image on a sheet through an image sensor of a CCD (Charge Coupled Device), a CIS (Contact Image Sensor) and the like to generate image data, and then outputs the generated image data to the image processing section 4.

The image processing section 4 carries out an image processing for the image data output from the scanner section 3 or the image data input from an external device or a recording medium. Further, the image processing section 4 detects, from the image data, an ECO mark (identification image) indicating that printing is carried out in the ECO mode. In the case in which the ECO mark is detected, the image processing section 4 temporarily decolors the ECO mark from the image data. Then, in response to the mode in which the printing of image data is carried out, the ECO mark is synthesized to the image data. The image processing section 4 outputs the image data subjected to the abovementioned image processing to the print section 5.

The print section 5 prints the image data output from the image processing section 4 on a sheet for printing. In the case in which the input information indicates the ECO mode, the print section 5 prints the image data with decolorable toner. On the other hand, in the case in which the input information indicates the general mode, the print section 5 prints the image data with non-decolorable toner.

The sheet feed section 6 supplies the sheet for printing to the print section 5.

The auxiliary storage device 9 comprises a set information storage section 91. The set information storage section 91 pre-stores the set information required for the printing processing in both the ECO mode and the general mode. For example, the set information includes the ECO mark image data to be synthesized to the image data, a character string to be synthesized to the image data together with the ECO mark, the setting relating to the image processing carried out by the image processing section 4 and the setting about whether or not to print the ECO mark. Hereinafter, the image data of the ECO mark is referred to as an ECO image data. Further, the auxiliary storage device 9 may be used as the area for storing the image data acquired or generated by the scanner section 3, the image processing section 4 and the external data input/output section 10.

The external data input/output section 10 inputs and outputs the image data. For example, the external data input/output section 10 consists of a communication interface such as an LAN (Local Area Network) and the like. In this case, the external data input/output section 10 acquires image data from an external device via a network. The external data input/output section 10 may provide the image data generated in its own apparatus to the external device. Further, for example, the external data input/output section 10 may use a device carrying out input/output to a recording medium such as a CD-ROM, a floppy disc and the like. In this case, the external data input/output section 10 acquires image data from the recording medium. The external data input/output section 10 may output the image data to the recording medium, and provide the image data to the external device.

Figure 4:
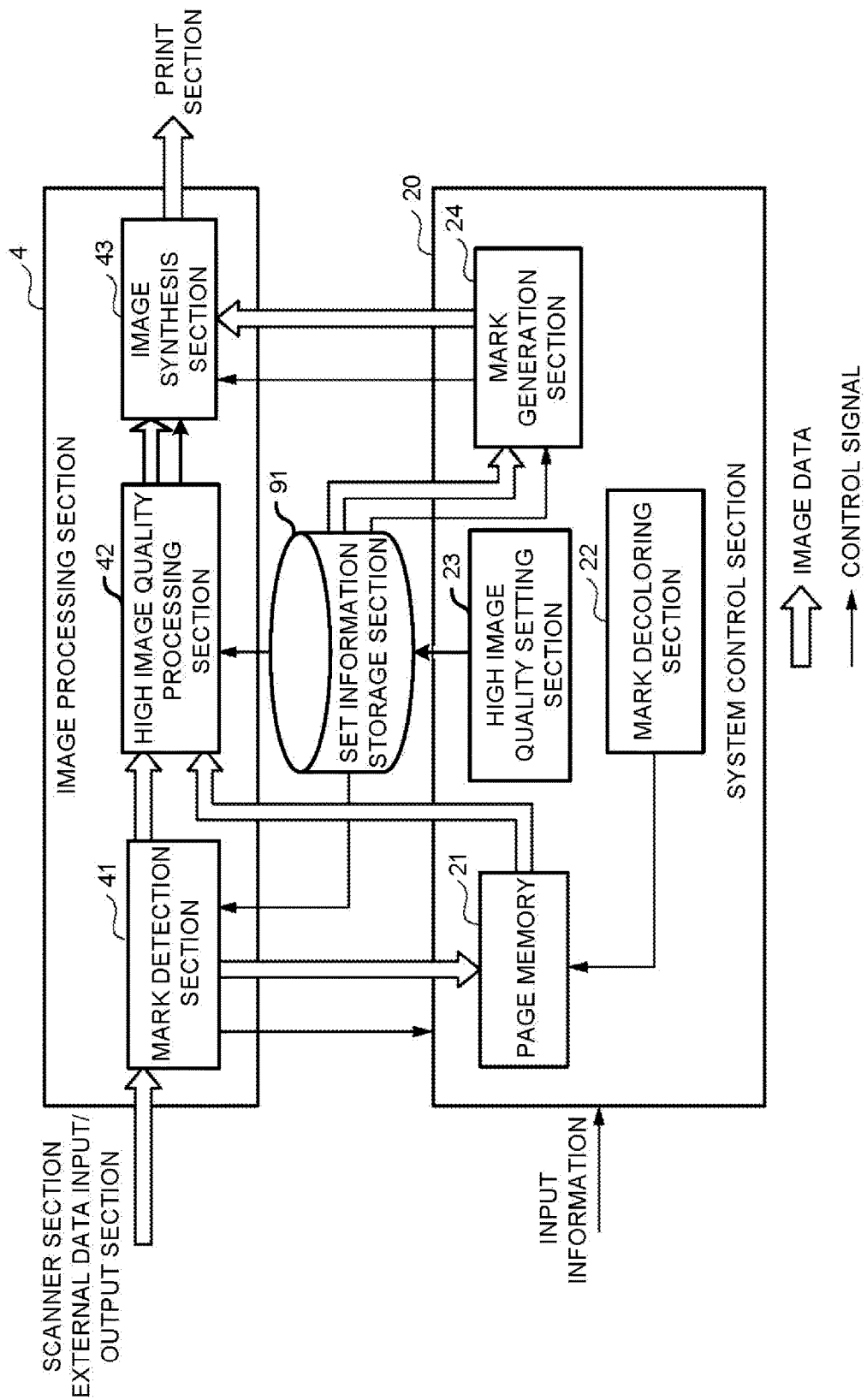
FIG. 4 is a block diagram illustrating the details of the functions of an image processing section 4 and a system control section 20 and the flow of image data.

FIG. 4 is a block diagram illustrating the details of the functions of the image processing section 4 and the system control section 20, and the flow of image data.

The system control section 20 includes a page memory 21, a mark decoloring section 22, a high image quality setting section 23 and a mark generation section 24.

The page memory 21 temporarily stores the image data output from the image processing section 4. For example, the page memory 21 is formed by using the memory 8.

The mark decoloring section 22 decolors the ECO mark from the image data in the page memory 21. The mark decoloring section 22 decolors the ECO mark according to the detection result of the presence/absence of ECO mark detected by a mark detection section 41.

The high image quality setting section 23 carries out setting relating to the image processing carried out by the image processing section 4. The high image quality setting section 23 performs a setting according to a notification of the detection of the presence/absence of ECO mark carried out by the mark detection section 41. In the case in which a notification indicating that the ECO mark is detected is received, the high image quality setting section 23 carries out a setting of the image processing for the image data from which the ECO mark is detected. Hereinafter, the mode of the image processing carried out for the image data from which the ECO mark is detected is referred to as an "ECO document mode". On the other hand, in the case in which a notification indicating that the ECO mark is not detected is received, the high image quality setting section 23 carries out a general image processing. Hereinafter, the mode of the image processing carried out for the image data from which the ECO mark is not detected is referred to as a "general document mode". That is, the high image quality setting section 23 sets the setting relating to the image processing used in the image processing section 4 to the setting of the ECO document mode or the setting of the general document mode. Hereinafter, the image processing modes described above are collectively referred to as a "document mode".

The mark generation section 24 generates an ECO mark to be synthesized to the image data. Specifically, the mark generation section 24 acquires, from the set information storage section 91, an ECO image data and character strings to be added to the ECO mark. The arrow from the set information storage section 91 to the mark generation section 24 indicates the flow of the ECO image data. The mark generation section 24 synthesizes the acquired character string and ECO image data to generate ECO data. In a case in which the input information output from the operation section 2 indicates a printing in the ECO mode, the mark generation section 24 generates the ECO data. The mark generation section 24 outputs the generated ECO data to the image processing section 4. Further, the character string to be synthesized to the ECO image data may be set by the user. For example, the user can make the sentence "this sheet is decolorable" to be contained in the ECO mark, thus appealing people to make contribution to environmental protection.

The image processing section 4 comprises the mark detection section 41, a high image quality processing section 42 and an image synthesis section 43.

The mark detection section 41 acquires the image data from the scanner section 3 or the external data input/output section 10, and detects the acquired image data and an ECO mark. Specifically, the mark detection section 41 acquires the ECO image data from the set information storage section 91, and detects the ECO mark through the pattern matching between the image data acquired from the scanner section 3 or the external data input/output section 10 and the ECO image data. The mark detection section 41 outputs the detection result of ECO mark to the system control section 20. The mark detection section 41 outputs the image data to the page memory 21 after the detection processing of the ECO mark is carried out.

The high image quality processing section 42 carries out various image processing such as color conversion processing, filter processing, area identification processing, density adjustment processing, variable magnification processing, gradation processing and the like for the image data. The high image quality processing section 42 carries out these image processing based on the settings corresponding to the document mode. In an image processing in the ECO document mode, the high image quality processing section 42 carries out an image processing for correcting the degradation of image quality caused during the copy process of the document printed in the ECO mode. In this case, the high image quality processing section 42 carries out an image processing for the image data from which the ECO mark has been decolored. Thus, the high image quality processing section 42 can carry out the image processing without being affected by the image data of ECO mark supposed to be unnecessary originally. On the other hand, in an image processing in the general document mode, the high image quality processing section 42 carries out the image processing such as a density correction or a filter correction and the like suitable for the document printed with the non-decolorable toner.

Specifically, the high image quality processing section 42 carries out an area identification processing to identify the photograph area, the character area and the like in the image data. The high image quality processing section 42 acquires the settings of image processing for each of these areas from the set information storage section 91. The acquired settings are switched to the settings corresponding to the document mode by the high image quality setting section 23 in advance. In the image processing in the ECO document mode, a color conversion processing and a density correction processing are mainly carried out. The color conversion processing is a processing of improving the gradation reproduction of the document printed with the decolorable toner. The density correction processing is a processing to broaden the density range of the maximum density of the decolorable toner having low contrast. In addition, in the image processing in the ECO document mode, a filter processing of emphasizing the sharpness feeling for the character part is carried out. This is because there is a tendency that the density of the photograph becomes thin, and the sharpness feeling of the character is weakened in the copy of the document printed with the decolorable toner. The method disclosed in Japanese Unexamined Patent Application Publication No. 2013-005454 may be used in the setting of image processing in the ECO document mode. In the printing or scanning of a document printed with a color material of a specific color, a method for reproducing a more appropriate density gradation has been disclosed in Japanese Unexamined Patent Application Publication No. 2013-005454. The high image quality processing section 42 outputs the image data subjected to the image processing to the image synthesis section 43.

The image synthesis section 43 synthesizes the image data and the ECO data, and then outputs the synthesized image data to the print section 5.

Figure 5:
FIG. 5 is a diagram illustrating a concrete example of an ECO mark.

FIG. 5 is a diagram illustrating a concrete example of an ECO mark.

A reference numeral 100 represents the image data of the ECO mark. In the example in FIG. 5, the ECO mark 100 is an image indicating a character "[E]". The ECO mark image data may be registered in the image forming apparatus 1 in advance, or registered or changed by the user. Further, the ECO mark is not, limited to an image indicating a character. As long as the ECO mark can be detected by the mark detection section 41 with sufficient accuracy, the form of the ECO mark image is not limited, which may be a logo, a picture, a graphic and the like.

Figure 6:
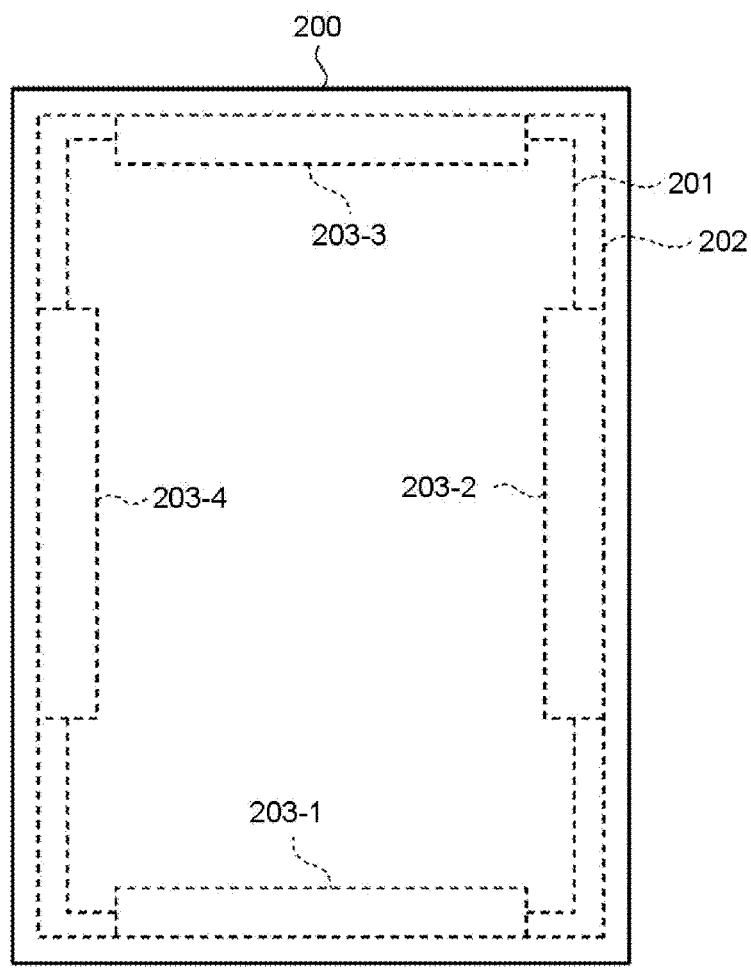
FIG. 6 is a diagram illustrating a concrete example of the positions where the ECO marks are printed on a sheet.

FIG. 6 is a diagram illustrating a concrete example of the positions where the ECO marks are printed on a sheet.

A reference numeral 200 represents the sheet on which the image data is to be printed. The area indicated by a reference numeral 201 on the sheet 200 generally refers to an area to be the range within which printing is carried out. This area is referred to as a printing range 201. Then, the area excluding the printing range 201 on the sheet 200 generally refers to a margin area where no printing is carried out. This area is referred to as a void area. In the present embodiment, the printing range is expanded from the printing range 201 to a printing range 202 by narrowing the void area, and as a result, an area for printing the ECO mark is secured. In FIG. 6, each of the areas indicated by reference numerals 203-1~203-4 represents the area for printing the ECO mark (hereinafter referred to as a "mark printing area"). Hereinafter, for simplifying the description, each of the mark printing areas 203-1~203-4 is referred to as a mark printing area 203 as long as it is not particularly distinguished.

The image synthesis section 43 selects an area for printing the ECO mark from the mark printing areas 203. The image synthesis section 43 synthesizes the ECO data to the area of image data corresponding to the selected mark printing area 203. The image data in which the ECO data is synthesized is to be printed in the printing range 202.

Figure 7:
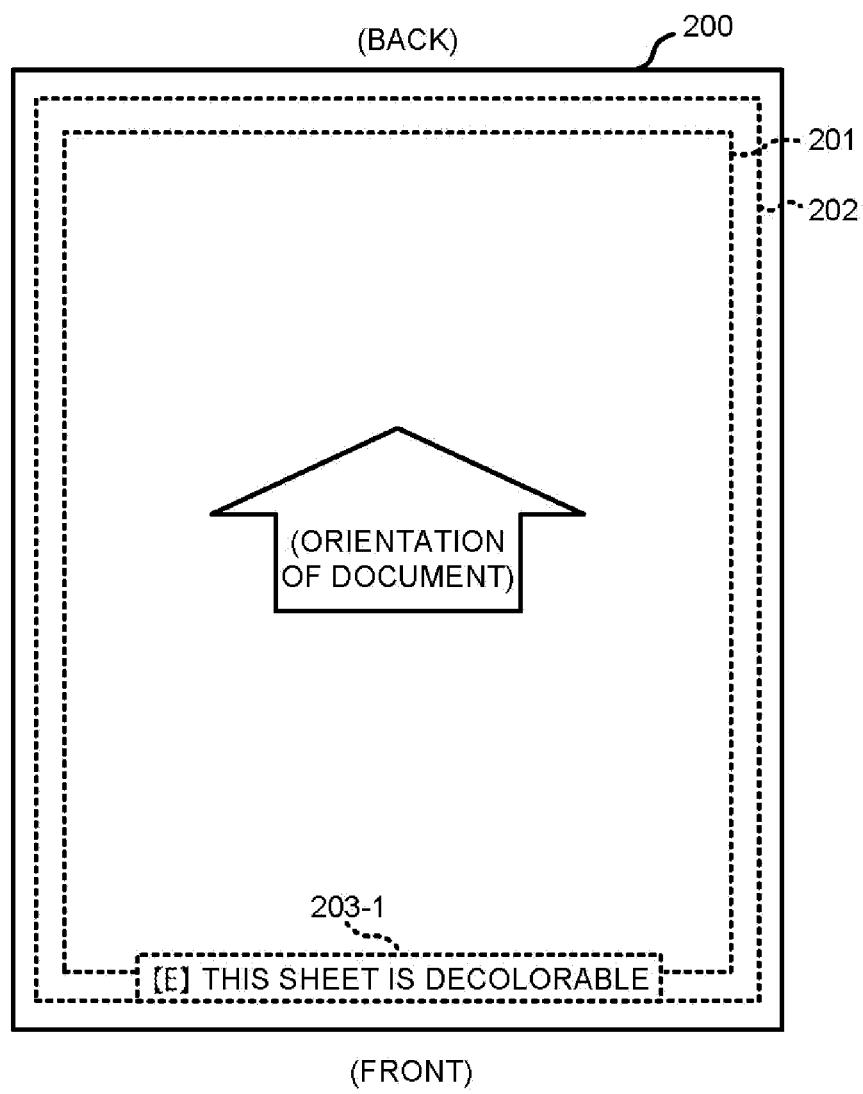
FIG. 7 is a diagram illustrating a concrete example of a sheet 200 on which an ECO mark is printed.
Figure 8:
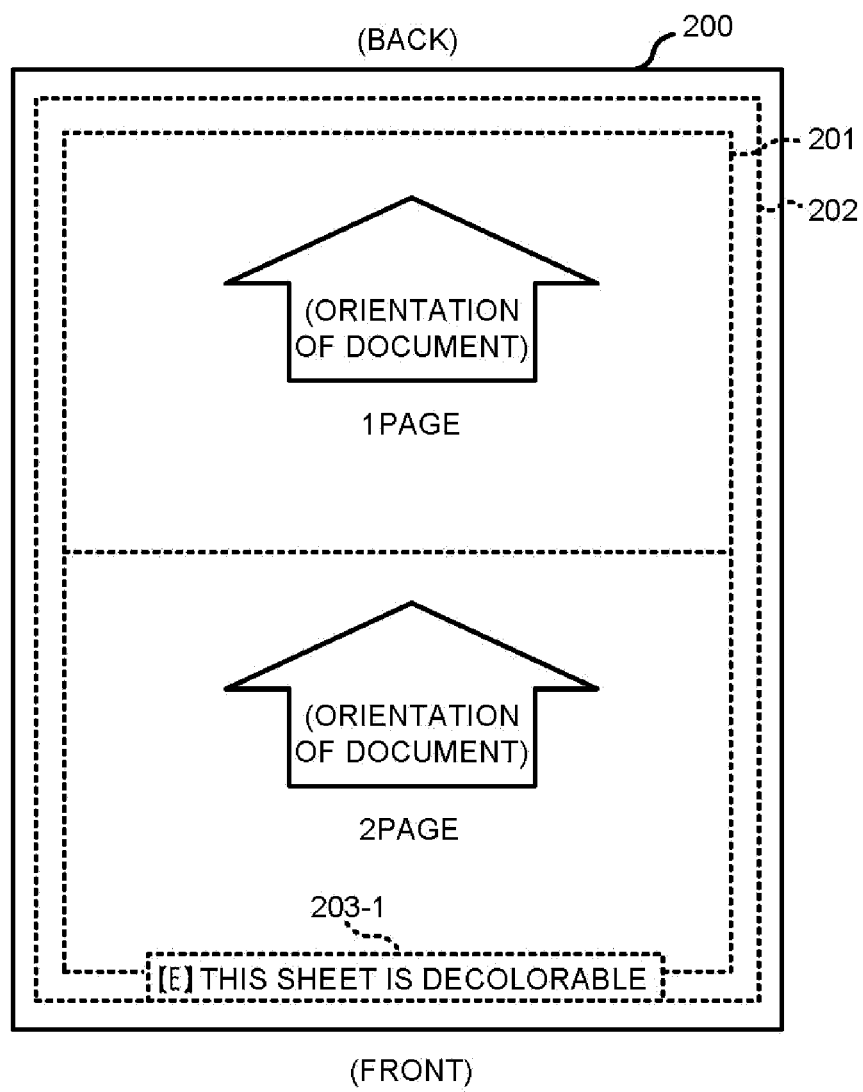
FIG. 8 is a diagram illustrating a concrete example of the sheet 200 on which an ECO mark is printed.
Figure 9:
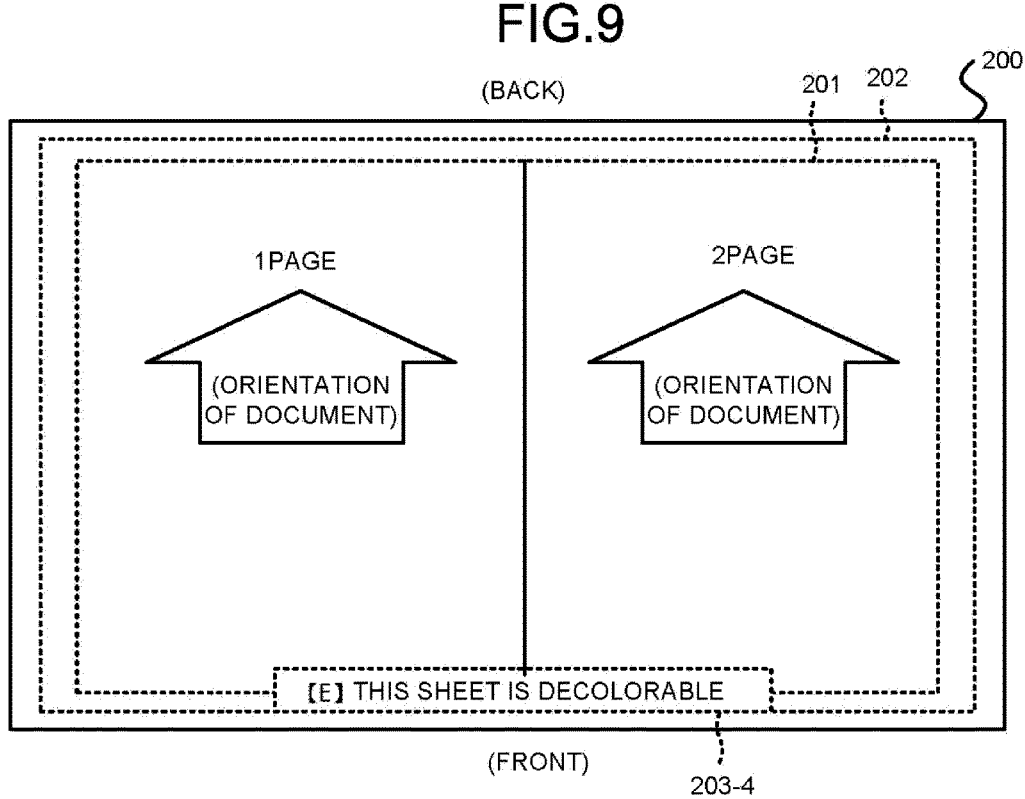
FIG. 9 is a diagram illustrating a concrete example of the sheet 200 on which an ECO mark is printed.

FIG. 7-FIG. 9 are diagrams illustrating concrete examples of the sheet 200 on which an ECO mark is printed.

In a case in which the ECO mark is printed newly, the mark printing area 203 may be selected according to any standard. In this case, for example, the mark printing area 203 may be selected based on the set orientation of the document, the information to be acquired from the image data or the sheet orientation. In the present embodiment, in the case in which the ECO mark is printed newly, it is assumed that the ECO mark is to be printed in the mark printing area 203 positioned in the front direction of the sheet. Further, in a case in which the document printed with the ECO mark is copied, the orientation of the document is determined by detecting the ECO mark.

FIG. 7 is a diagram illustrating a case in which one document is copied to one single sheet 200. In the case in which the ECO mark is newly printed, the ECO mark is to be printed in the mark printing area 203-1 positioned at the front side of the sheet 200. Further, in a case in which the document printed with the ECO mark is copied, it can be determined that the position of the mark printing area 203 where the ECO mark is detected indicates the front of the document. Thus, an ECO mark is to be printed again at the original position where the last ECO mark is decolored.

FIG. 8 is a diagram illustrating a case in which two horizontal documents are copied to one vertical sheet 200. FIG. 9 is a diagram illustrating a case in which two vertical documents are copied to one horizontal sheet 200. In each case, similar to the example in FIG. 7, the ECO mark to be printed newly is to be printed in the mark printing area 203 positioned in the front of the sheet. The ECO mark to be printed newly is to be printed in the mark printing area 203-1 in the case shown in FIG. 8, and in the mark printing area 203-4 (or the mark printing area 203-1) in the case shown in FIG. 9. Further, when the document printed with the ECO mark is copied, in each case, the orientation of the document can be determined according to the detected positions of the ECO marks. By selecting the mark printing area 203 positioned at the front side with respect to the orientation of the document, the ECO mark is printed as shown in FIG. 8 and FIG. 9.

Figure 10:
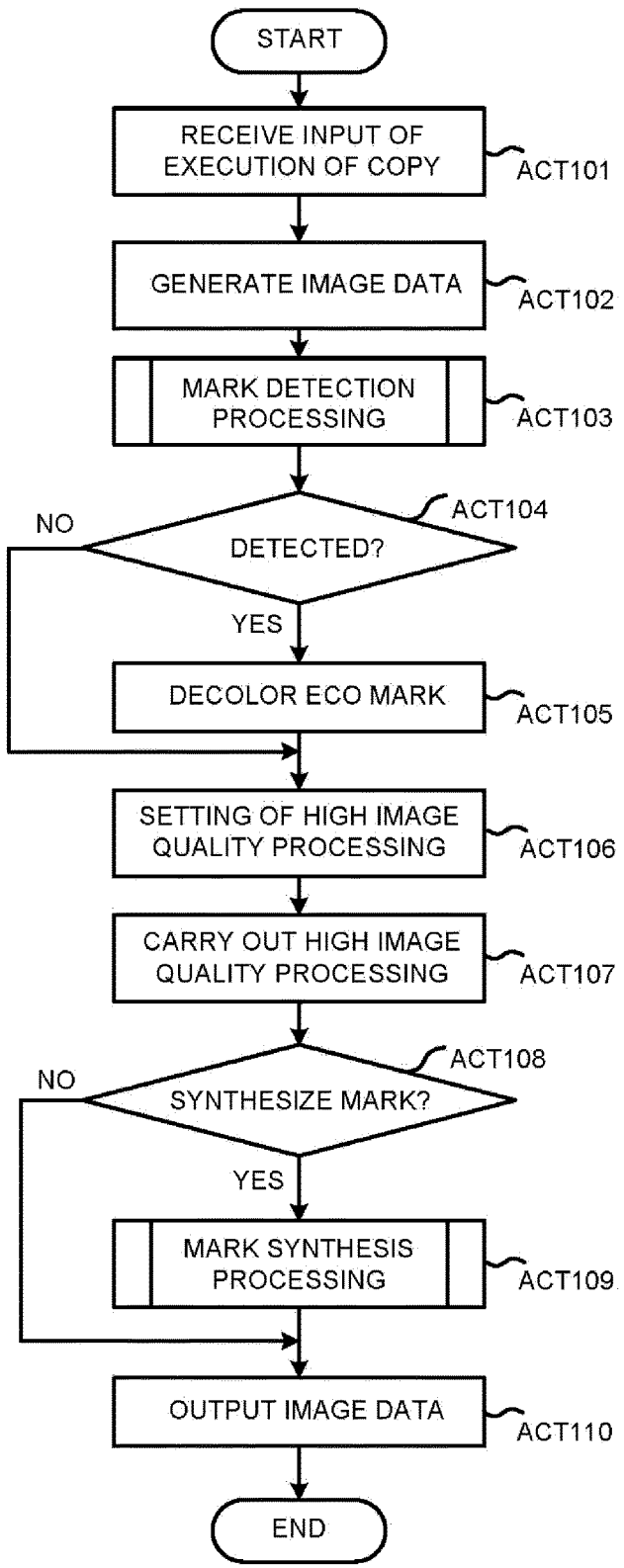
FIG. 10 is a flowchart illustrating the flow of a copy processing in the image forming apparatus 1 according to the embodiment.

FIG. 10 is a flowchart illustrating the flow of a copy processing in the image forming apparatus 1 according to the embodiment.

First, the operation section 2 receives an input of executing a copy processing (ACT 101). The scanner section 3 reads the set document to generate image data (ACT 102) The scanner section 3 outputs the generated image data to the image processing section 4. The mark detection section 41 acquires the image data generated by the scanner section 3. The mark detection section 41 carries out a mark detection processing (ACT 103). The mark detection processing is a processing of detecting the ECO mark from the image data. The mark detection section 41 outputs the detection result of the ECO mark to the system control section 20. Further, in a case in which the ECO mark is detected, the mark detection section 41 further outputs orientation information indicating the orientation of document to the high image quality processing section 42. The orientation of document is determined according to the orientation of the ECO mark. The mark detection section 41 outputs the image data to the page memory 21 after the mark detection processing is carried out.

The system control section 20 determines, according to a notification of the detection of the presence/absence of the ECO mark, whether or not the ECO mark is detected (ACT 104). If it is determined that the ECO mark is detected (YES in ACT 104), the mark decoloring section 22 decolors the ECO mark from the image data (ACT 105). The mark decoloring section 22 decolors the ECO mark from the image data in the page memory 21 based on the orientation information. On the other hand, if it is determined that the ECO mark is not detected (NO in ACT 104), the system control section 20 doesn't carry out the mark decoloring processing. Next, the high image quality setting section 23 carries out the setting of the high image quality processing (ACT 106). According to the instruction of the system control section 20, the high image quality setting section 23 changes the setting of the high image quality processing stored in the set information storage section 91 in response to the detection result of the ECO mark. The high image quality processing section 42 carries out the high image quality processing for the image data based on the setting of the high image quality processing (ACT 107). The high image quality processing section 42 outputs the image data subjected to the high image quality processing to the image synthesis section 43. Next, the system control section 20 determines, based on the input information received in ACT 101, whether or not to synthesize the ECO mark to the image data (ACT 108). If it is determined to synthesize the ECO mark (YES in ACT 108), the mark generation section 24 generates the ECO data and then outputs it to the image synthesis section 43. The image synthesis section 43 carries out a mark synthesis processing to the image data with the ECO data output from the mark generation section 24 (ACT 109). The image synthesis section 43 outputs the image data subjected to the mark synthesis processing to the print section 5 (ACT 110). On the other hand, if it is determined not to synthesize the ECO mark (NO in ACT 108), the image synthesis section 43 outputs the image data to the print section 5 without carrying out the mark synthesis processing.

Figure 11:
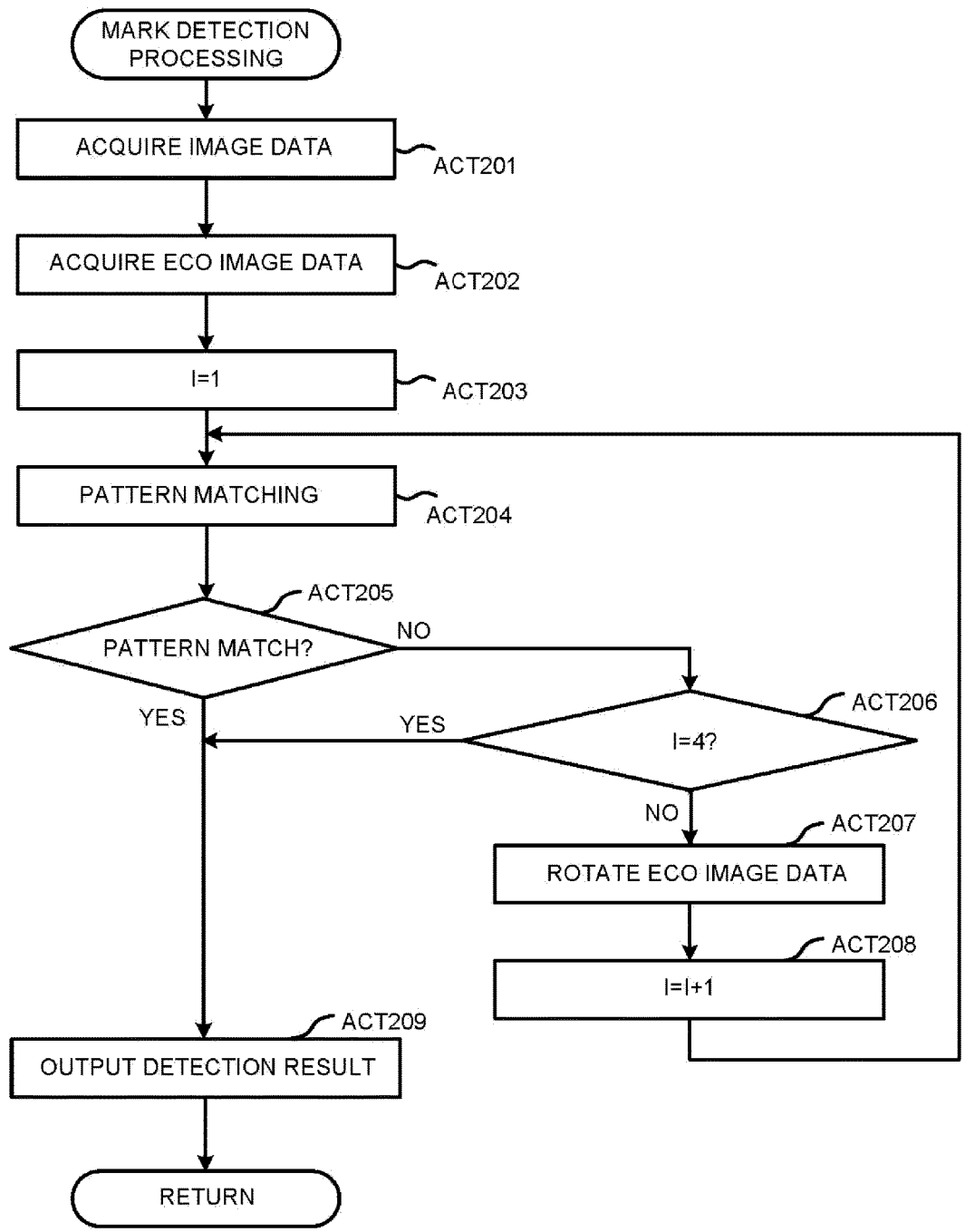
FIG. 11 is a flowchart illustrating the flow of a mark detection processing.

FIG. 11 is a flowchart illustrating the flow of a mark detection processing.

First, the mark detection section 41 acquires the image data from the scanner section 3 (ACT 201). The image data may be acquired from the external data input/output section 10. The mark detection section 41 acquires the information indicating the area having a possibility that the ECO mark is to be detected from the set information storage section 91. Specifically, the mark detection section 41 acquires the information indicating the positions of the mark printing areas 203-1~203-4 shown in FIG. 6. The mark detection section 41 acquires the ECO image data from the set information storage section 91 (ACT 202). The mark detection section 41 sets the value of the variable I indicating the orientation of the ECO image data to "1" (ACT 203). The mark detection section 41 carries out pattern matching between image of the mark printing area 203-I in the image data and the ECO image data (ACT 204). If the variable I is increased, the mark detection section 41 carries out the matching with each mark printing area 203 by repeating the pattern matching. That is, in the present embodiment, the mark detection section 41 carries out the pattern matching in the order of the mark printing area 203-1 to the mark printing area 203-4. First, the mark detection section 41 carries out the pattern matching with the image in the mark printing area 203-I (I=1). The mark detection section 41 determines whether or not the image in the mark printing area 203-I (I=1) matches with the ECO image data (ACT 205). If it is determined that the image in the mark printing area 203-I (I=1) doesn't match with the ECO image data (NO in ACT 205), the mark detection section 41 determines whether or not the value of I is "4" 206). If the value of I is not "4" (NO in ACT 206), the mark detection section 41 rotates the ECO image data by 90 degrees in a given direction (ACT 207). The given direction mentioned herein refers to a direction corresponding to the order of the mark printing area 203 where the pattern matching is carried out. That is, when carrying out the pattern matching in the above-mentioned order, the mark detection section 41 rotates the ECO image data to the left direction. Through the rotation, the mark detection section 41 can detect the ECO marks printed in different orientations. The mark detection section 41 increases the variable I (ACT 208). Then, the processing returns to ACT 204, and the mark detection section 41 carries out the pattern matching with the image in the mark printing area 203-I (I=2).

On the other hand, if the value of I is "4" (YES in ACT 206), the ECO image data has been rotated by 360 degrees. That is, the ECO mark cannot be detected in any orientation. Thus, ACT 209 is taken and the mark detection section 41 outputs the value of the variable I as the detection result (ACT 209). Similarly, if it is determined in ACT 205 that the image in the mark printing area 203-I (I=1) matches with the ECO image data (YES in ACT 205), the mark detection section 41 outputs the detection result.

The mark detection section 41 can detect the ECO mark from the image data by carrying out the mark detecting processing described above. The mark detection section 41 further can identify the orientation of document through the mark printing area 203 where the ECO mark is detected.

Figure 12:
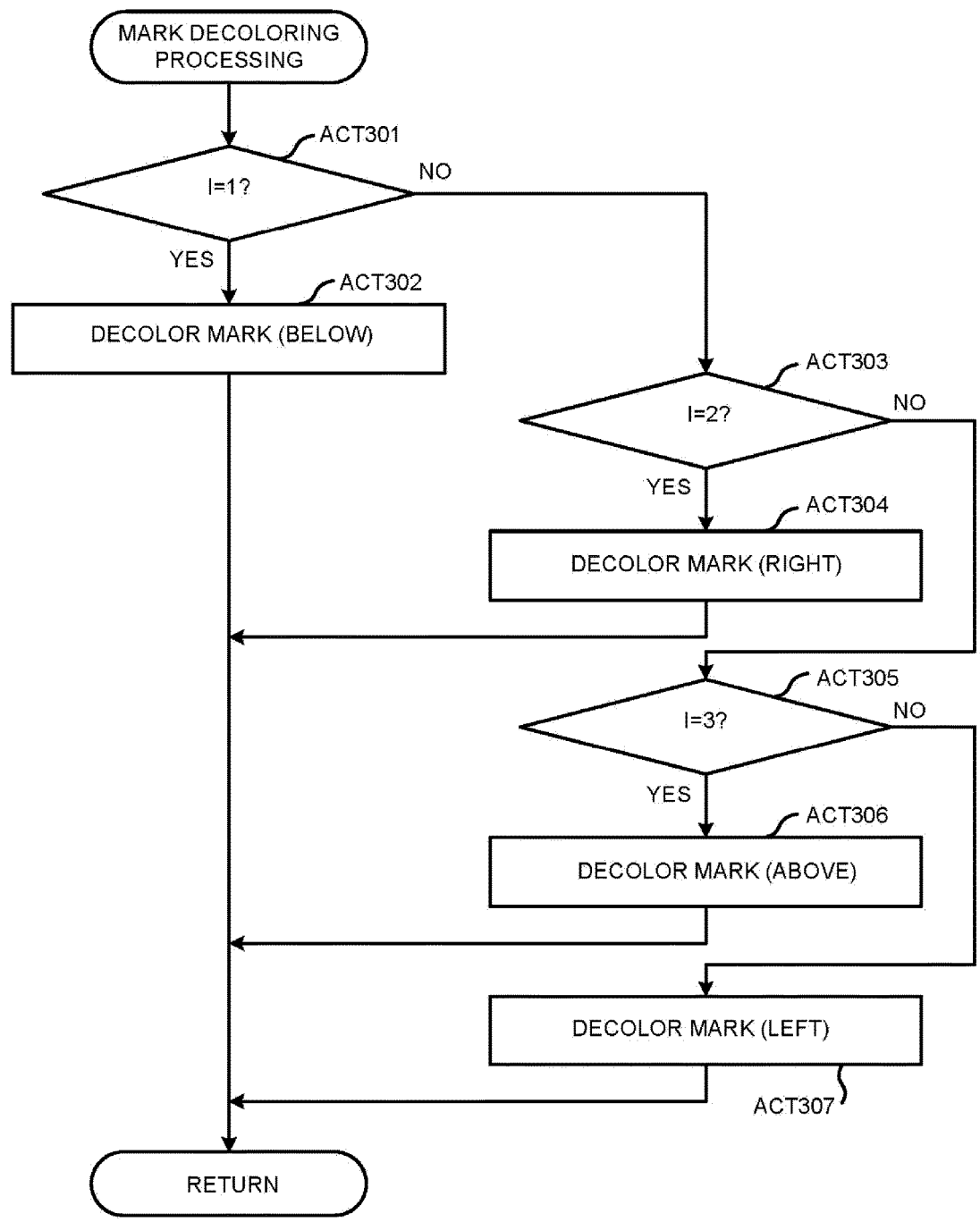
FIG. 12 is a flowchart illustrating the flow of a mark decoloring processing.

FIG. 12 is a flowchart illustrating the flow of a mark decoloring processing.

In the mark decoloring processing, the orientation information is input at the beginning of the processing. For example, in the case in which the mark detecting processing shown in FIG. 11 is carried out, the values of the variable I are input as the orientation information in the mark decoloring processing. The reason why the mark decoloring processing is carried out is that the ECO mark is detected, and the value of the variable I to be input in the mark decoloring processing is any of "1" to "4". The mark decoloring section 22 determines the orientation of document according to the orientation information (variable I). In the following description, it is exemplified with reference to FIG. 6 and FIG. 7.

First, the mark decoloring section 22 determines whether or not the value of I is "1" (ACT 301). If the value of I is "1" (YES in ACT 301), the mark decoloring section 22 decolors the ECO mark from the mark printing area 203-1 (ACT 302). For facilitating the description, in FIG. 12, the ECO mark of the mark printing area 203-1 is referred to as a "mark (below)".

On the other hand, if the value of I is not "1" (NO in ACT 301), the mark decoloring section 22 determines whether or not the value of I is "2" (ACT 303). If the value of I is "2" (YES in ACT 303), the mark decoloring section 22 decolors the ECO mark from the mark printing area 203-2 (ACT 304). Similar to ACT 302, in FIG. 12, the ECO mark of the mark printing area 203-2 is referred to as a "mark (right)".

On the other hand, if the value of I is not "2" (NO in ACT 303), the mark decoloring section 22 determines whether or not the value of I is "3" (ACT 305). If the value of I is "3" (YES in ACT 305), the mark decoloring section 22 decolors the ECO mark from the mark printing area 203-3 (ACT 306). Similar to ACT 302, in FIG. 12, the ECO mark of the mark printing area 203-3 is referred to as a "mark (above)".

On the other hand, if the value of I is not "3" (NO in ACT 305), the mark decoloring section 22 decolors the ECO mark from the mark printing area 203-4 (ACT 307). Similar to ACT 302, in FIG. 12, the ECO mark of the mark printing area 203-4 is referred to as a "mark (left)".

Further, no limitation is given to the method for decoloring the ECO mark from each mark printing area 203. For example, the mark decoloring section 22 may replace the image in the mark printing area 203 with the image in the area excluding the mark printing area 203. In this case, in order not to generate incompatibility due to replacement, it may be replaced with an image of an area closer to the mark printing area 203.

FIG. 13 is a flowchart illustrating the flow of a mark synthesis processing.

In the mark synthesis processing, the orientation information is input at the beginning of the processing. For example, in the case in which the mark detecting processing shown in FIG. 11 is carried out, the values of the variable I are input as the orientation information in the mark synthesis processing. The reason why the mark synthesis processing is carried out is that the ECO mark is detected, and the value of the variable I to be input in the mark synthesis processing is any of "1" to "4". The image synthesis section 43 determines the orientation of document according to the orientation information (variable I). In the following description, it is exemplified with reference to FIG. 6 and FIG. 7.

First, the image synthesis section 43 determines whether or not the value of I is "1" (ACT 401). If the value of I is "1" (YES in ACT 401), the image synthesis section 43 synthesizes the ECO data to the mark printing area 203-1 (ACT 402). For facilitating the description, in FIG. 13, the ECO data to be synthesized to the mark printing area 203-1 is referred to as a "mark (below)".

On the other hand, if the value of I is not "1" (NO in ACT 401), the image synthesis section 43 determines whether or not the value of I is "2" (ACT 403). If the value of I is "2" (YES in ACT 403), the image synthesis section 43 synthesizes the ECO data to the mark printing area 203-2 (ACT 404). Similar to ACT 402, in FIG. 13, the ECO data to be synthesized to the mark printing area 203-2 is referred to as a "mark (right)".

On the other hand, if the value of I is not "2" (NO in ACT 403), the image synthesis section 43 determines whether or not the value of I is "3" (ACT 405). If the value of I is "3" (YES in ACT 405), the image synthesis section 43 synthesizes the ECO data to the mark printing area 203-3 (ACT 406). Similar to ACT 402, in FIG. 13, the ECO data to be synthesized to the mark printing area 203-3 is referred to as a "mark (above)".

On the other hand, if the value of I is not "3" (NO in ACT 405), the image synthesis section 43 synthesizes the ECO data to the mark printing area 203-4 (ACT 407). Similar to ACT 402, in FIG. 13, the ECO data to be synthesized to the mark printing area 203-4 is referred to as a "mark (left)".

Further, the image synthesis section 43 may synthesize the image data in such a manner that the mark printing area 203 is contained in the general printing range 201. In addition, no limitation is given to the method for synthesizing the ECO data to the mark printing area 203. For example, the image of the mark printing area 203 may be simply replaced by the image of the ECO data. Further, for example, the background of the image of the ECO data may be replaced by the image of the mark printing area 203.

According to the embodiment, the image forming apparatus constituted as described above detects the ECO mark indicating that printing is carried out in the ECO mode from the image data. Then, the image forming apparatus 1 decolors the detected ECO mark from the image data. In the case of printing with the decolorable toner, the image forming apparatus 1 can avoid copying the originally unnecessary ECO mark as the document through detecting and decoloring the ECO mark.

Further, the image forming apparatus 1 can carry out the image processing corresponding to the document mode through the detection of the ECO mark. In this way, the image forming apparatus 1 can suppress the deterioration of the image quality in the copy of the printings output in the ECO mode.

Hereinafter, a modification of the image forming apparatus 1 according to the embodiment is described.

The mark detection section 41 may be configured to detect the ECO mark of a specific color. In this case, the scanner section 3 is formed by a color CCD capable of performing color reading. For example, the mark detection section 41 detects a detection result in the case in which the color difference of RGB signal is below a given threshold value. In this way, the identification accuracy of the black ECO mark can be improved.

The image forming apparatus 1 may send the image data subjected to image processing to an external device. Further, the image forming apparatus 1 may record the image data subjected to image processing in a recording medium. Further, the image forming apparatus 1 may store the image data subjected to image processing in its own apparatus. In this case, the image forming apparatus 1 may read the stored image data as needed and provide it for any use purpose.

In this embodiment, "decoloring" means to make it difficult to recognize a color of an image formed on an image receiving member after the image is formed on the image receiving member by a recording material which has different color from the color of the image receiving material. The color of recording material may be achromatic color including black or white, not limiting to chromatic color. In addition, "decoloring the image" means "erasing the image".

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. An image forming apparatus, comprising:
    a reading section configured to read a first image formed on a first sheet to generate first image data of the first image printed on the first sheet;
    memory that stores pre-set identification image data;
    an input device configured to input information to set a condition of image forming on a second sheet which is different from the first sheet;
    an image processing section configured to:
        determine whether or not the first image data includes an identification image data that matches the pre-set identification image data to detect, from the first image data, the existence of the identification image data;
        identify a first position and a first orientation of an identification image in the first image if the image processing section determined that the first image data includes the identification image data, wherein the identification image is to be created with the identification image data;
        delete the identification image data from the first image data to generate a second image data if the image processing sectioned determined that the first image data includes the identification image data; and
        synthesize the pre-set identification image data stored in the memory with the second image data, wherein a second image has a pre-set identification image at a second position and with a second orientation in the second image if the input information indicates that the decolorable toner is to be used for image forming on the second sheet,
        wherein the second image is to be created with the second image data synthesized with the pre-set identification image data,
        wherein the pre-set identification image is to be created with the pre-set identification image data,
        wherein the second position is a position of the pre-set identification image in the second image and same position as the first position of the identification image in the first image, and
        wherein the second orientation is an orientation of the pre-set identification image in the second image and same orientation as the first orientation of the identification image in the first image; and
    an image forming section configured to form the second image on the second sheet.

2. The image forming apparatus according to claim 1, wherein the image processing section carries out a correction to improve an image quality of the second image data.

3. The image forming apparatus according to claim 2, wherein the image processing section carries out, for the second image data a density correction for broadening a range in density of a photograph part of the second image data and a filter correction for emphasizing a sharpness of a character part of the second image data.

4. The image forming apparatus according to claim 1, wherein the image processing section synthesizes an image data or a character data as the pre-set identification image data set by a user with the second image data.

5. The image forming apparatus according to claim 1, wherein the image processing section synthesizes pre-set the identification image data to an area set by a user in the second image data.

6. The image forming apparatus according to claim 1, wherein the image processing section detects the identification image data from a given area of the first image data through a pattern matching between a pattern image indicating the pre-set identification image data stored in the memory and the first image data.

7. The image forming apparatus according to claim 6, wherein the image processing section detects the identification image data from a plurality of areas of the first image data by rotating the pattern image to carry out the pattern matching.

8. The image forming apparatus according to claim 1, wherein the image processing section detects the identification image data of a specific color from the first image data.

9. An image forming method, including:
    reading, by a reading section, a first image formed on a first sheet to generate first image data of the first image printed on the first sheet;
    storing, by a set information storage section, pre-set identification image data;
    inputting, by an input device, an information to set a condition of image forming on a second sheet which is different from the first sheet;
    determining, by an image processing section, whether or not the first image data includes an identification image data that matches the pre-set identification image data to detect, from the first image data, the existence of the identification image data;
    identifying, by the image processing section, a first position and a first orientation of an identification image in the first image if the image processing section determined that the first image data includes the identification image data, wherein the identification image is to be created with the identification image data;
    deleting, by the image processing section, the identification image data from the first image data to generate a second image data if the image processing section determined that the first image data includes the identification data;
    synthesizing, by the image processing section, the pre-set identification image data stored in the memory with the second image data,
        wherein a second image has a pre-set identification image at a second position and with a second orientation in the second image if the information indicates that the decolorable toner is to be used for copying the first sheet,
        wherein the second image is to be created with the second image data synthesized with the pre-set identification image data,
        wherein the pre-set identification image is to be created with the pre-set identification image data, wherein the second position is a position of the pre-set identification image in the second image and same position as the first position of the identification image in the first image, and wherein the second orientation is an orientation of the pre-set identification image in the second image and same orientation as the first orientation of the identification image in the first image; and forming, by an image forming section, the second image on the second sheet.

10. The image forming apparatus according to claim 1, wherein the reading section includes a scanner section that reads the first image through an image sensor of a CCD (Charge Coupled Device) to generate the first image data.

11. The image forming apparatus according to claim 1, wherein the reading section includes a scanner section that reads the first image through an image sensor of a CIS (Contact Image Sensor) to generate the first image data.

12. The image forming method according to claim 9, wherein the image processing section is configured not to synthesize the identification image data with the second image data if the input information indicates that the non-decolorable toner is to be used for copying the first sheet.

13. An image forming apparatus, comprising:

a reading section configured to read a first image formed on a first sheet to generate first image data of the first image printed on the first sheet;

a memory that stores pre-set identification image data;

an input device configured to input information to set a condition of image forming on a second sheet which is different from the first sheet;

an image processing section configured to:

determine whether or not the first image data includes an identification image data that matches the pre-set identification image data to detect, from the first image data, the existence of the identification image data;

identify a first position and a first orientation of an identification image in the first image if the image processing section determined that the first image data includes the identification image data, wherein the identification image is to be created with the identification image data;

delete the identification image data from the first image data to generate a second image data if the image processing section determined that the first image data includes the identification image data; and synthesize the pre-set identification image data stored in the memory with a third image data created based on the second image data and a layout of a second image in a third image in the image forming, wherein the second image is to be created with the second image data, wherein the layout is determined based on the condition indicated by the input information, wherein the third image is to be created with the third image data synthesized with the pre-set identification image data and has a pre-set identification image at a second position and with a second orientation in the third image if the input information indicates that the decolorable toner is to be used for the image forming, wherein the pre-set identification image is to be created with the pre-set identification image data, wherein the second position and the second orientation are determined with reference to the first position, the first orientation, and the layout; and an image forming section configured to form the third image on the second sheet.

* * * * *